United States Patent
Sakuma

(10) Patent No.: US 9,722,652 B2
(45) Date of Patent: Aug. 1, 2017

(54) MOBILE APPARATUS, CONTROL METHOD, AND CONTROL PROGRAM

(71) Applicant: KYOCERA Corporation, Kyoto-shi, Kyoto (JP)

(72) Inventor: Manabu Sakuma, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/152,517

(22) Filed: May 11, 2016

(65) Prior Publication Data

US 2016/0336986 A1    Nov. 17, 2016

(30) Foreign Application Priority Data

May 12, 2015   (JP) ................... 2015-097769

(51) Int. Cl.
| | |
|---|---|
| H04B 13/02 | (2006.01) |
| H04B 17/00 | (2015.01) |
| H04B 7/00 | (2006.01) |
| H04B 1/38 | (2015.01) |
| G06F 3/041 | (2006.01) |

(52) U.S. Cl.
CPC ............. *H04B 1/38* (2013.01); *G06F 3/041* (2013.01); *G06F 3/0418* (2013.01); *H04B 2001/3894* (2013.01)

(58) Field of Classification Search
CPC ..... G06F 3/0418; G06F 3/044; H04B 1/3888; H04B 2001/3894
USPC ................... 455/67.11, 566, 575.8, 40, 66.1; 345/173, 174
See application file for complete search history.

(56) References Cited

U.S. PATENT DOCUMENTS

| | | | | |
|---|---|---|---|---|
| 8,310,463 | B2* | 11/2012 | Yang | G06F 3/044 345/173 |
| 2004/0108861 | A1* | 6/2004 | Germiquet | G01F 23/265 324/663 |
| 2012/0050214 | A1* | 3/2012 | Kremin | G06F 3/0418 345/174 |
| 2013/0242486 | A1 | 9/2013 | Okano | |
| 2015/0009173 | A1* | 1/2015 | Rodzevski | G06F 3/0414 345/174 |
| 2015/0016001 | A1* | 1/2015 | Quirk | H02H 11/00 361/78 |
| 2015/0022481 | A1* | 1/2015 | Andersson | G06F 3/044 345/174 |
| 2015/0062069 | A1 | 3/2015 | Shin et al. | |

(Continued)

FOREIGN PATENT DOCUMENTS

| | | |
|---|---|---|
| JP | 2010-224063 A | 10/2010 |
| JP | 2011-187384 A | 9/2011 |

(Continued)

OTHER PUBLICATIONS

European Search Report for EP Application No. 16169340.3, dated Nov. 22, 2016.

(Continued)

*Primary Examiner* — Simon Nguyen
(74) *Attorney, Agent, or Firm* — Hauptman Ham, LLP

(57) ABSTRACT

A mobile apparatus includes a touch screen and a controller. The controller estimates that the mobile apparatus is being immersed in water when a detection result of the touch screen satisfies a predetermined condition.

8 Claims, 5 Drawing Sheets

(56) References Cited

U.S. PATENT DOCUMENTS

| | | | |
|---|---|---|---|
| 2015/0185919 A1* | 7/2015 | Chang | G06F 3/0418 345/174 |
| 2016/0191097 A1* | 6/2016 | Huh | H04B 1/3888 455/575.1 |
| 2016/0266717 A1* | 9/2016 | Oral | G06F 3/0418 |

FOREIGN PATENT DOCUMENTS

| | | |
|---|---|---|
| JP | 2012-108859 A | 6/2012 |
| JP | 2014-115705 A | 6/2014 |
| WO | 2008/086302 A1 | 7/2008 |
| WO | 2012/111056 A1 | 8/2012 |

OTHER PUBLICATIONS

Office Action in JP Application No. 2015-097769, dated Mar. 14, 2017, for which an explanation of relevance is attached.

\* cited by examiner

MOBILE APPARATUS, CONTROL METHOD, AND CONTROL PROGRAM

CROSS-REFERENCE TO RELATED APPLICATION

The present application claims priority to and incorporates by reference the entire contents of Japanese Patent Application No. 2015-097769 filed in Japan on May 12, 2015.

FIELD

Embodiments of the present disclosure relate generally to mobile apparatuses, control methods, and control programs.

BACKGROUND

Some mobile apparatuses mounting a touch screen execute various kinds of functions in accordance with operations detected via a touch screen.

SUMMARY

A mobile apparatus is disclosed. In one of embodiments, the mobile apparatus comprises a touch screen, and a controller. The controller is configured to estimate that the mobile apparatus is being immersed in water when a detection result of the touch screen satisfies a predetermined condition.

In another one of embodiments, a control method, executed by a mobile apparatus including a touch screen, comprises: detecting whether the touch screen satisfies a predetermined condition; and estimating that the mobile apparatus is being immersed in water when a detection result satisfies the predetermined condition.

In another one of embodiments, a non-transitory storage medium stores a control program. The control program causes, when executed by a mobile apparatus, the mobile apparatus to execute detecting whether the touch screen satisfies a predetermined condition; and estimating that the mobile apparatus is being immersed in water when a detection result satisfies the predetermined condition.

The above and other objects, features, advantages and technical and industrial significance of embodiments will be better understood by reading the following detailed description, when considered in connection with the accompanying drawings.

DETAILED DESCRIPTION

The following describes a plurality of embodiments for performing a mobile apparatus, a control method, and a control program according to the present application in detail with reference to the accompanying drawings. The following describes a smartphone as an example of a mobile electronic device.

Figure 1:
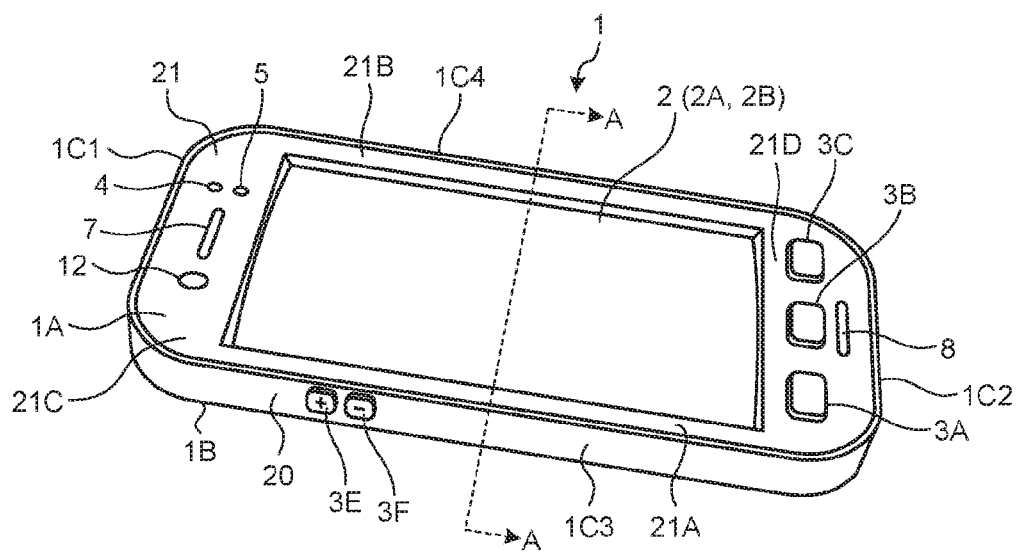
FIG. 1 is a perspective view of a smartphone according to an embodiment.
Figure 2:
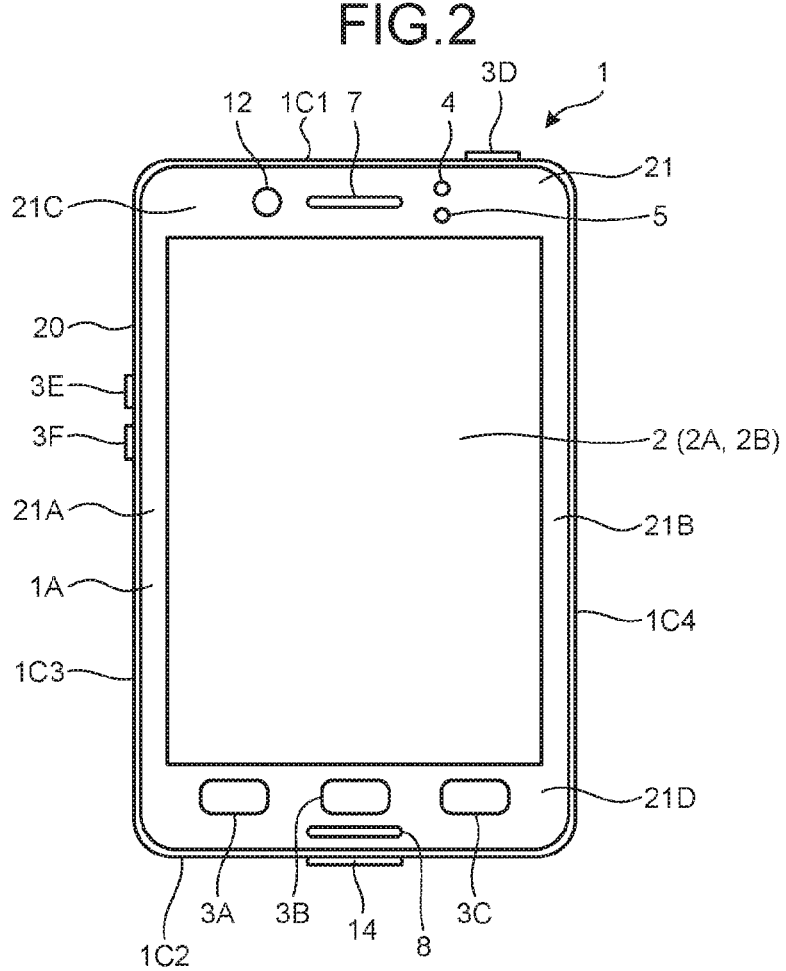
FIG. 2 is a front elevation of the smartphone.
Figure 3:
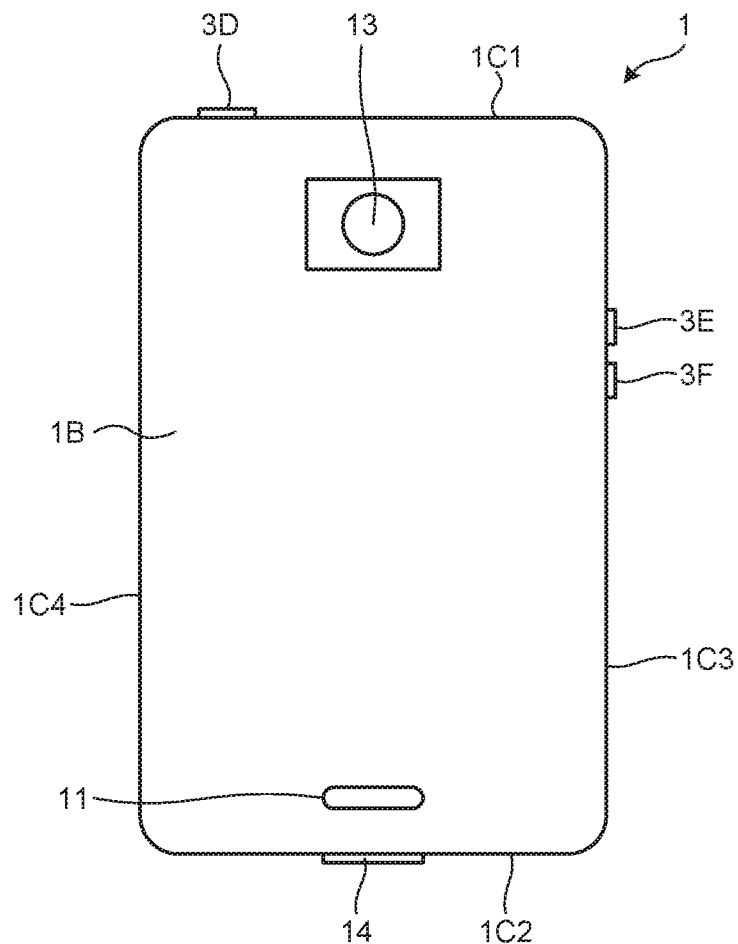
FIG. 3 is a rear elevation of the smartphone.

The following describes an overall configuration of a smartphone 1 according to an embodiment with reference to FIG. 1 through FIG. 3. As illustrated in FIG. 1 through FIG. 3, the smartphone 1 includes a housing 20. The housing 20 includes a front face 1A, a back face 1B, and side faces 1C1 to 1C4. The front face 1A is a front face of the housing 20. The back face 1B is a back face of the housing 20. The side faces 1C1 to 1C4 are side faces connecting the front face 1A and the back face 1B. The following may collectively refer to the side faces 1C1 to 1C4 as a side face 1C without specifying which face.

The smartphone 1 includes a touch screen display 2, buttons (keys) 3A to 3C, an illumination sensor 4, a proximity sensor 5, a receiver 7, a microphone 8, and a camera 12 on the front face 1A. The smartphone 1 includes a speaker 11 and a camera 13 on the back face 1B. The smartphone 1 includes buttons 3D to 3F and a connector 14 on the side face 1C. The following may collectively refer to the buttons 3A to 3F as a button 3 without specifying which button.

The touch screen display 2 includes a display 2A and a touch screen 2B. Although both the display 2A and the touch screen 2B have a nearly rectangular shape in an example in FIG. 1, the shape of the display 2A and the touch screen 2B is not limited thereto; the display 2A and the touch screen 2B each can have any shape such as a square or a circle. Although the display 2A and the touch screen 2B are arranged so as to be stacked with each other in an example in FIG. 1, the arrangement of the display 2A and the touch screen 2B is not limited thereto; the display 2A and the touch screen 2B may be arranged side by side or arranged separated from each other, for example. Although a long side of the display 2A is along a long side of the touch screen 2B, whereas a short side of the display 2A is along a short side of the touch screen 2B in an example in FIG. 1, the manner of stacking the display 2A and the touch screen 2B is not limited thereto; when the display 2A and the touch screen 2B are arranged so as to be stacked with each other, one or a plurality of sides of the display 2A are not necessarily along any side of the touch screen 2B, for example.

The display 2A includes a display device such as a liquid crystal display (LCD), an organic electro-luminescence display (OELD), or an inorganic electro-luminescence display (IELD). The display 2A displays letters, images, symbols, figures, and the like.

The touch screen 2B detects contact of a finger, a pen, a stylus pen, or the like against the touch screen 2B. The touch screen 2B can detect positions at which a plurality of fingers, pens, stylus pens, or the like are in contact with the touch screen 2B. The following description may refer to the finger, the pen, the stylus pen, or the like that are in contact with the touch screen 2B as a "contacting object."

A detection system of the touch screen 2B may be any type such as an electrostatic capacitance system, a resistance film system, a surface acoustic wave system, or a load detection system. The following description assumes that a user is in contact with the touch screen 2B using fingers to operate the smartphone 1 for simplifying the description.

The smartphone 1 determines a type of a gesture based on at least one of contact detected by the touch screen 2B, a position at which contact is detected, a change in a position at which contact is detected, an interval during which pieces of contact are detected, and the number of times pieces of contact are detected. The gesture is an operation performed against the touch screen 2B. Examples of the gesture determined by the smartphone 1 include, but are not limited to, touch, long touch, release, swipe, tap, double tap, long tap, drag, flick, pinch-in, and pinch-out.

The smartphone 1 performs operations in accordance with these gestures determined via the touch screen 2B. Consequently, operability that is intuitive and easy to use for the user is achieved. The operation that the smartphone 1 performs in accordance with the determined gesture may vary in accordance with a screen displayed on the display 2A. The following description may refer to "detecting contact by the touch screen 2B and determining the type of the gesture to be X by the smartphone 1 based on the detected contact" as a "smartphone detects X" or a "controller detects X" for simplifying the description.

The housing 20 of the smartphone 1 has a sealed structure. The housing 20 is a space in which water is prevented from entering the inside thereof by the sealed structure. The smartphone 1 blocks openings formed in the housing 20 with a functional member that passes airs but does not pass liquids, a cap, or the like in order to achieve the sealed structure. The functional member that passes airs but does not pass liquids is achieved by Gore-Tex (registered trademark), Drytec (registered trademark), eVent (registered trademark), BERGTECH (registered trademark), or HyventD (registered trademark), for example. In one of embodiments, the housing 20 includes the touch screen display 2 and the button 3. In this case, the smartphone 1 prevents water from entering gaps between the housing 20 and the touch screen display 2 and the button 3 with the functional member that passes airs but does not pass liquids or the like.

The smartphone 1 including the sealed structure can provide various use cases. Examples of the use cases include a case used in wet areas and a case used in water.

Figure 4:
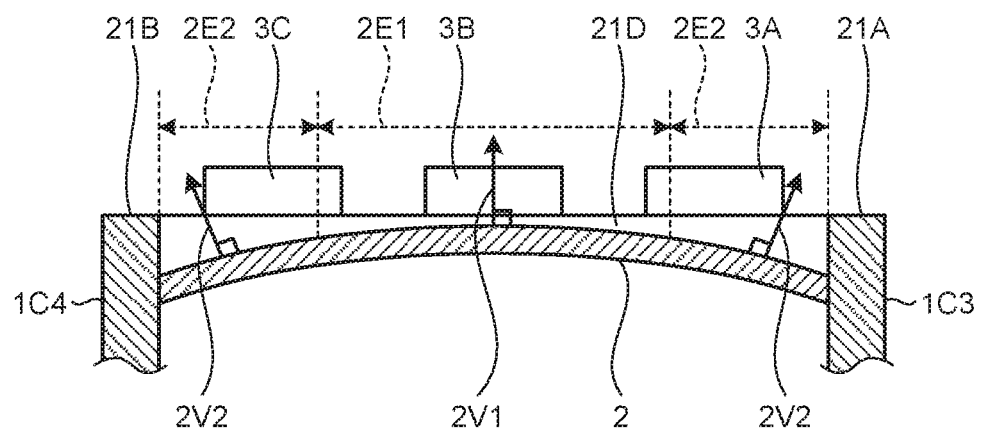
FIG. 4 is a sectional schematic view along an A-A line in FIG. 1.

The following describes a positional relation among the touch screen display 2, the button 3, and the housing 20 of the smartphone 1 with reference to FIG. 1 through FIG. 4. FIG. 4 is a sectional schematic diagram along an A-A line in FIG. 1.

The front face 1A of the housing 20 includes a bezel 21. Although one of embodiments describes a case in which the bezel 21 surrounds the touch screen display 2, the embodiments are not limited thereto; the bezel 21 may be provided in only a longitudinal direction or a short-side direction of the smartphone 1, for example.

In an example illustrated in FIG. 4, the bezel 21 protrudes from the touch screen display 2 in the front face 1A of the housing 20. The bezel 21 includes first parts 21A and 21C and second parts 21B and 21D.

The first part 21A and the second part 21B extend along the long side of the smartphone 1. The touch screen display 2 is arranged in between the first part 21A and the second part 21B. The first part 21A and the second part 21B face each other across the touch screen display 2. In the short-side direction of the smartphone 1, there are steps between the first part 21A and the second part 21B and the touch screen display 2.

The first part 21C and the second part 21D extend along the short side of the smartphone 1. The touch screen display 2 is arranged in between the first part 21C and the second part 21D. The first part 21C and the second part 21D face each other across the touch screen display 2. In the long-side direction of the smartphone 1, there are steps between the first part 21C and the second part 21D and the touch screen display 2.

The second part 21D of the bezel 21 includes the buttons 3A to 3C. The buttons 3A to 3C protrude from the second part 21D in the front face 1A. There are steps between the bezel 21 and the buttons 3A to 3C. In other words, the buttons 3A to 3C protrude from the touch screen display 2 and the bezel 21 in the front face 1A of the housing 20.

A surface of the touch screen display 2 is curved. The touch screen display 2 includes a curved surface. The surface of the touch screen display 2 includes a first region 2E1 and a second region 2E2. The first region 2E1 includes a central region on the surface of the touch screen display 2. The second region 2E2 includes regions around the first region 2E1 on the surface of the touch screen display 2. The second region 2E2 includes regions near the bezel 21 on the surface of the touch screen display 2. The second region 2E2 includes curved surfaces. A normal line 2V1 in the first region 2E1 and a normal line 2V2 in the second region 2E2 are not parallel to each other. In one of embodiments, the normal line 2V1 and the normal line 2V2 do not cross each other. The touch screen display 2 includes a part lower than the bezel 21 in a normal direction of the normal line 2V1 from a center of the surface of the first region 2E1.

The smartphone 1 may be placed on a table or the like with the front face 1A faced down, for example. In this case, in the smartphone 1, when the bezel 21 and the buttons 3A to 3C and the table or the like are brought into contact with each other, a gap occurs between the touch screen display 2 and the table or the like. Consequently, the smartphone 1 prevents the touch screen display 2 from being in contact with the table or the like.

When the detection system of the touch screen 2B is the electrostatic capacitance system, the touch screen 2B causes difference in measurement values between a case in which the surface has been immersed in water and a case in which the contacting object is in contact therewith. An area of the touch screen 2B, which is in contact with the water, gradually increases as the smartphone 1 is immersed in the water. The smartphone 1 in water is in contact with water via the entire surface of the touch screen 2B. In this case, the touch screen 2B can detect contact of water with the entire surface. In contrast, when the user operates the smartphone 1 in a place not in water, the touch screen 2B detects a change in a detection value at which a finger, a touch pen, or the like is present. Consequently, the smartphone 1 can estimate that the subject apparatus is being immersed in water when a detection result of the touch screen 2B detects the contact of the entire surface.

When the resistance film system or the load detection system is employed as another detection system, the touch screen 2B may detect a change in the magnitude of voltage as information for determining whether the subject apparatus is in water, for example. When the surface acoustic wave system is employed as another detection system, the touch screen 2B may detect attenuation of a surface acoustic wave transmitted by the subject apparatus as the information for determining whether the subject apparatus is in water, for example. When an infrared system is employed as another detection system, the touch screen 2B may detect attenuation of infrared rays transmitted by the subject apparatus as the information for determining whether the subject apparatus is in water, for example.

Situations of being immersed in water include a case in which the subject apparatus is in water, a case in which the entire surface of the touch screen 2B is being immersed in water, and a case in which the entire surface of the touch screen 2B is being immersed in water with a predetermined rate.

In one of embodiments, in the smartphone 1, the bezel 21 protrudes from the surface of the touch screen display 2 in the front face 1A. The smartphone 1 includes a region in which the surface of the touch screen display 2 is not a plane. Consequently, the smartphone 1 can make the contacting object, which is different from water, difficult to be in uniform contact with the entire touch screen display 2.

In the smartphone 1, the contacting object such as a thigh or a buttock of the user may be pressed against the entire surface of the front face 1A, for example. In this case, the smartphone 1 can make a force applied to a neighborhood of the bezel 21 of the touch screen display 2 smaller than a force applied to a center of the touch screen display 2 owing to the steps between the touch screen display 2 and the bezel 21. In this case, the detection value of the touch screen 2B is smaller in the neighborhood of the bezel 21 than a part around the center of the touch screen display 2. Consequently, when the touch screen 2B detects the contact of the entire surface, the smartphone 1 can determine whether the smartphone 1 is being immersed in water or the contacting object is being in contact therewith by comparing the detection value near the bezel 21 with a threshold. Consequently, the smartphone 1 can improve the accuracy of estimating whether the smartphone 1 is being immersed in water based on the detection result of the touch screen 2B.

The bezel 21 may include four corners as illustrated in FIG. 1, for example. The corners are parts at which two parts in the bezel 21 cross each other. In this case, when the contacting object is pressed against the entire surface of the front face 1A, the contacting object is difficult to be in contact with neighborhoods of the corners of the bezel 21 of the touch screen 2B. The smartphone 1 can make a force by the contacting object applied to the neighborhoods of the corners of the bezel 21 of the touch screen display 2 smaller than a force applied to a part near the center of the bezel 21. Consequently, the smartphone 1 can also determine whether the smartphone 1 is being immersed in water or the contacting object is being in contact therewith based on a detection value near the corners of the touch screen 2B. Consequently, the smartphone 1 can further improve the accuracy of estimating whether the smartphone 1 is being immersed in water.

Figure 5:
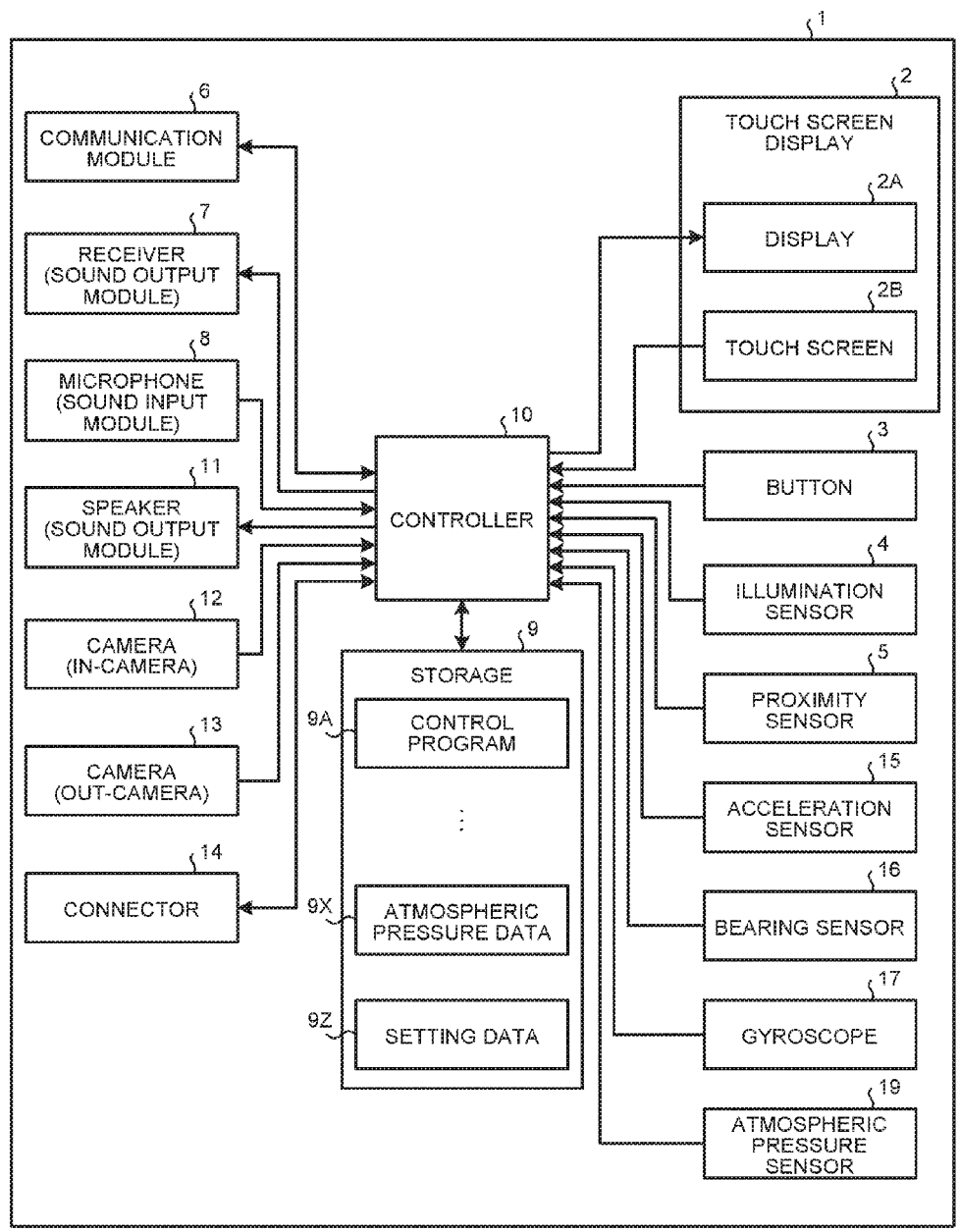
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication module 6, the receiver 7, the microphone 8, a storage 9, a controller 10, the speaker 11, the cameras 12 and 13, the connector 14, an acceleration sensor 15, a bearing sensor 16, a gyroscope 17, and an atmospheric pressure sensor 19.

As described above, the touch screen display 2 includes the display 2A and the touch screen 2B. The display 2A displays letters, images, symbols, figures, and the like. The touch screen 2B detects contact. The controller 10 detects gestures against the smartphone 1. Specifically, the controller 10 detects operations (gestures) against the touch screen 2B (the touch screen display 2) in cooperation with the touch screen 2B.

The button 3 is operated by the user. The button 3 includes the button 3A to the button 3F. The controller 10 detects operations of the button 3 in cooperation with the button 3. Examples of the operations of the button 3 include, but are not limited to, click, double click, triple click, push, and multi-push.

The buttons 3A to 3C are a home button, a back button, or a menu button, for example. The button 3D is a power-on/off button of the smartphone 1, for example. The button 3D may also serve as a sleep/sleep release button. The buttons 3E and 3F are volume buttons, for example.

The illumination sensor 4 detects the illumination of ambient light of the smartphone 1. The illumination indicates the intensity and brightness of light. The illumination sensor 4 is used for adjusting the brightness of the display 2A, for example. The proximity sensor 5 detects the presence of a nearby object in a noncontact manner. The proximity sensor 5 detects the presence of the object based on a change in a magnetic field, a change in a return time of a reflective wave of an ultrasonic wave, or the like. The proximity sensor 5 detects that the touch screen display 2 has approached a face, for example. The illumination sensor 4 and the proximity sensor 5 may be configured as one sensor. The illumination sensor 4 may be used as a proximity sensor.

The communication module 6 performs communication by radio. Communication systems supported by the communication module 6 are wireless communication standards. Examples of the wireless communication standards include cellular phone communication standards such as 2G, 3G, and 4G. Examples of the cellular phone communication standards include Long Term Evolution (LTE), Wideband Code Division Multiple Access (W-CDMA), Wideband Code Division Multiple Access 2000 (CDMA2000), Personal Digital Cellular (PDC), Global System for Mobile Communications (GSM) (registered trademark), and Personal Handy-phone System (PHS). Other examples of the wireless communication standards include Worldwide Interoperability for Microwave Access (WiMAX), IEEE802.11, Bluetooth (registered trademark), Infrared Data Association (IrDA), and Near Field Communication (NFC). The communication module 6 may support one or a plurality of the communication standards described above.

The receiver 7 and the speaker 11 are examples of an output module that outputs sounds. The receiver 7 and the speaker 11 can output sound signals transmitted from the controller 10 as sounds. The receiver 7 may be used for outputting voices of a person at the other end during a telephone conversation, for example. The speaker 11 may be used for outputting ringtones and music, for example. One of the receiver 7 and the speaker 11 may also function as the other. The microphone 8 is an example of an input module that inputs sounds. The microphone 8 can convert voices of the user or the like into sound signals and transmit the sound signals to the controller 10.

The storage 9 can store therein computer programs and data. The storage 9 may be used as a work area that temporarily stores therein processing results of the controller 10. The storage 9 includes a recording medium. The recording medium may include any non-transitory storage medium such as a semiconductor storage medium or a magnetic storage medium. The storage 9 may include a plurality of types of storage media. The storage 9 may include a combination of a portable storage medium such as a memory card, an optical disc, or a magneto-optical disc and a reading apparatus for the storage medium. The storage 9 may include a storage device used as a temporary storage area such as a random access memory (RAM).

The computer program stored in the storage 9 includes an application executed in the foreground or the background and a control program that supports operation of the application. The application causes the display 2A to display a screen and causes the controller 10 to execute processing responsive to the gesture detected via the touch screen 2B, for example. The control program is an operating system (OS), for example. The application and the control program may be installed in the storage 9 via wireless communication by the communication module 6 or a non-transitory storage medium.

The storage 9 stores therein a control program 9A, atmospheric pressure data 9X, and setting data 9Z, for example. The atmospheric pressure data 9X includes information indicating atmospheric pressure acting on the smartphone 1. The setting data 9Z includes information relating to various kinds of settings relating to the operation of the smartphone 1.

The control program 9A can provide functions relating to various kinds of control for operating the smartphone 1. The control program 9A controls the communication module 6, the receiver 7, the microphone 8, and the like and thereby achieves telephone conversation, for example. The functions provided by the control program 9A include a function to perform various kinds of control such as changing information displayed on the display 2A in accordance with the gesture detected via the touch screen 2B. The functions provided by the control program 9A include a function to detect movement, stop, and the like of the user having the smartphone 1 by controlling the acceleration sensor 15, the atmospheric pressure sensor 19, and the like. The functions provided by the control program 9A may be used in combination with functions provided by other computer programs such as a calculation application 9B and a telephone application 9C.

The control program 9A can provide a function to estimate whether the smartphone 1 (the subject apparatus) is being immersed in water. A method for estimating whether the smartphone 1 is being immersed in water will be described below.

The atmospheric pressure data 9X may include a plurality of pieces of atmospheric pressure data. The atmospheric pressure data 9X is stored in a time-series manner. The atmospheric pressure information includes items such as time and atmospheric pressure. The time indicates time at which the atmospheric pressure is detected by the atmospheric pressure sensor 19. The atmospheric pressure indicates a value of the pressure of the air detected by the atmospheric pressure sensor 19.

The setting data 9Z includes estimation condition data for estimating whether the smartphone 1 (the subject apparatus) is being immersed in water based on the detection result of the touch screen 2B. The estimation condition data includes a condition for estimating that the smartphone 1 has been out of water. The estimation condition data will be described below.

The controller 10 includes a processor. Examples of the processor include, but are not limited to, a central processing unit (CPU), a system-on-a-chip (SoC), a micro control unit (MCU), a field-programmable gate array (FPGA), and a coprocessor. The controller 10 can integrally control the operation of the smartphone 1. Various kinds of functions of the controller 10 are implemented based on control by the controller 10.

Specifically, the controller 10 can execute instructions included in the computer programs stored in the storage 9. The controller 10 can refer to the data stored in the storage 9 as needed. The controller 10 controls functional modules in accordance with the data and the instructions. The controller 10 controls the functional modules and thereby implements various kinds of functions. Examples of the functional modules include, but are not limited to, the display 2A, the communication module 6, the receiver 7, and the speaker 11. The controller 10 may change control in accordance with detection results of detection modules. Examples of the detection modules include, but are not limited to, the touch screen 2B, the button 3, the illumination sensor 4, the proximity sensor 5, the microphone 8, the camera 12, the camera 13, the acceleration sensor 15, the bearing sensor 16, the gyroscope 17, and the atmospheric pressure sensor 19.

The controller 10 executes the control program 9A and can thereby execute various kinds of control such as changing the information displayed on the display 2A in accordance with the gesture detected via the touch screen 2B, for example.

The camera 12 is an in-camera that photographs an object facing the front face 1A. The camera 13 is an out-camera that photographs an object facing the back face 1B.

The connector 14 is a terminal to which another apparatus is connected. The connector 14 may be a general-purpose terminal such as Universal Serial Bus (USB), High-Definition Multimedia Interface (HDMI) (registered trademark), Light Peak (Thunderbolt (registered trademark)), or an earphone/microphone connector. The connector 14 may be an exclusive terminal such as a Dock connector. Examples of apparatuses connected to the connector 14 include, but are not limited to, an external storage, a speaker, and a communication apparatus.

The acceleration sensor 15 can detect the direction and magnitude of acceleration acting on the smartphone 1. The bearing sensor 16 can detect the direction of geomagnetism. The gyroscope 17 can detect the angle and angular velocity of the smartphone 1. The atmospheric pressure sensor 19 can detect atmospheric pressure acting on the smartphone 1. Detection results of the acceleration sensor 15, the bearing sensor 16, the gyroscope 17, and the atmospheric pressure sensor 19 are used in combination to detect changes in the position and attitude of the smartphone 1.

Part or the whole of the computer programs and the data stored by the storage 9 in FIG. 4 may be downloaded from another apparatus via wireless communication by the communication module 6. Part or the whole of the computer programs and the data stored by the storage 9 in FIG. 4 may be stored in a non-transitory storage medium that can be read by the reading apparatus included in the storage 9. Part or the whole of the computer programs and the data stored by the storage 9 in FIG. 4 may be stored in a non-transitory storage medium that can be read by a reading apparatus connected to the connector 14. Examples of the non-transitory storage medium include, but are not limited to, optical discs such as a compact disc (CD) (registered trademark), a digital versatile disc (DVD) (registered trademark), and Blu-ray (registered trademark), magneto-optical discs, magnetic storage media, memory cards, and solid-state storage media.

The configuration of the smartphone 1 illustrated in FIG. 4 is an example and may appropriately be changed to the extent that the essence of the present disclosure is not impaired. The number and type of the button 3 are not limited to an example in FIG. 4, for example. The smartphone 1 may include buttons with numeric key arrangement, QWERTY arrangement, or the like in place of the buttons 3A to 3C as buttons for screen-related operations. The smartphone 1 may include only one button or does not necessarily provide any button for the screen-related operations. Although the smartphone 1 includes the two cameras in an example illustrated in FIG. 4, the smartphone 1 may include only one camera or does not necessarily include any camera. Although the smartphone 1 includes four kinds of sensors to detect position and attitude in an example illustrated in FIG. 4, the smartphone 1 does not necessarily include all the sensors. Alternatively, the smartphone 1 may include a sensor of another type for detecting at least one of position and attitude.

Figure 6:
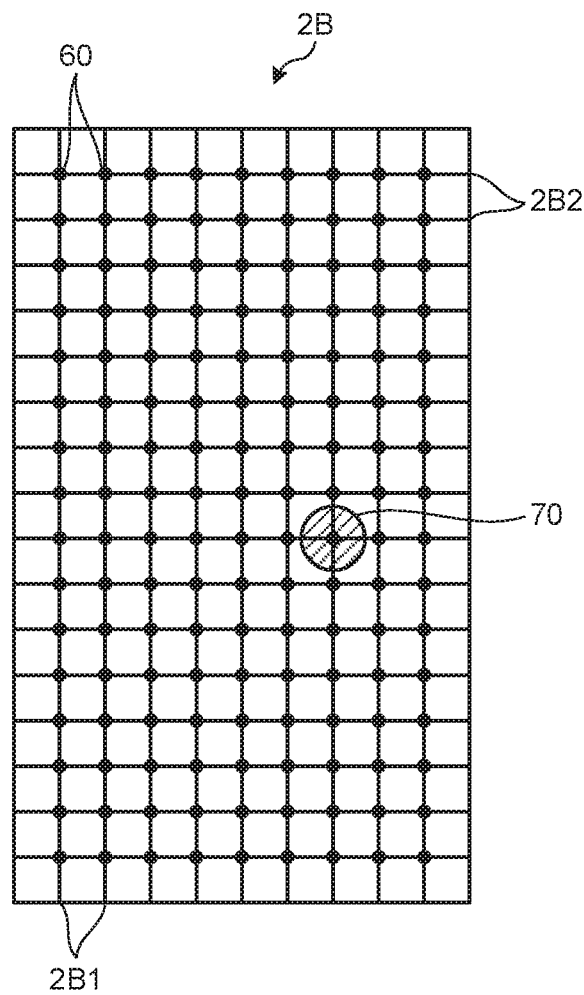
FIG. 6 is a diagram of an example of a detection configuration in a touch screen.

The following describes an example of estimating whether the smartphone 1 is being immersed in water with reference to FIG. 6. FIG. 6 is a diagram of an example of a detection configuration in the touch screen 2B. The touch screen 2B illustrated in FIG. 6 has a detection system of the electrostatic capacitance system.

As illustrated in FIG. 6, the touch screen 2B includes a plurality of first electrodes 2B1 and a plurality of second electrodes 2B2. The first electrodes 2B1 are electrodes extending in the long-side direction of the touch screen 2B. The second electrodes 2B2 are electrodes extending in the short-side direction of the touch screen 2B. The first electrodes 2B1 and the second electrodes 2B2 cross with each other in a matrix manner. Parts at which the first electrodes 2B1 and the second electrodes 2B2 cross with each other are detection points 60 of the touch screen 2B. The touch screen 2B includes a plurality of detection points 60. The detection points 60 are used when the smartphone 1 specifies a contact position (a contact point) of the contacting object on the touch screen 2B. The detection points 60 are positioned in a matrix manner.

In the touch screen 2B, when a conductive contacting object approaches a first electrode 2B1 and a second electrode 2B2, capacitive coupling occurs between the contacting object and the electrodes. In the touch screen 2B, a detection value of the detection point 60 between the electrodes at which capacitive coupling occurs changes. In an example illustrated in FIG. 6, in the touch screen 2B, the detection value of the detection point 60 near a contact point 70 of the contacting object is larger than the detection values of the other detection points 60. Consequently, the smartphone 1 can detect the contact point 70 of the contacting object on the touch screen 2B based on the changed detection value of the detection point 60.

When the smartphone 1 is perfectly being immersed in water, the touch screen 2B is in contact with water through the entire surface, whereby the detection values change at all the detection points 60. In other words, the touch screen 2B has larger detection values in water than in the air. Consequently, the smartphone 1 can estimate whether the subject apparatus is being immersed in water based on the detection results at the detection points 60. Specifically, the smartphone 1 can estimate that the subject apparatus is being immersed in water when the detection values satisfy an estimation condition at all the detection points 60.

The smartphone 1 can change a method of estimation when the bezel 21 is included, for example. Specifically, the smartphone 1 may estimate that the subject apparatus is being immersed in water when the detection points 60 of the touch screen 2B in the neighborhood of the four corners of the bezel 21 detect contact.

The estimation condition data of the setting data 9Z includes information indicating a first condition. The first condition includes a condition for estimating that the subject apparatus is being immersed in water. The first condition includes a condition corresponding to a predetermined detection point 60 for use in the estimation. The first condition includes a detection threshold, a detection range, and a range of a detected contact point corresponding to the predetermined detection point 60, for example. The predetermined detection point 60 may be all the detection points 60. The predetermined detection point 60 may be some of the detection points 60. The first condition may include a change range per predetermined time and a threshold.

In one of embodiments, the first condition includes a condition for estimating that the subject apparatus is being immersed in water when contact is detected at the detection points 60. When the subject apparatus is being immersed in water, in the touch screen 2B, the detection points 60 detect contact, for example. However, when the subject apparatus is not being immersed in water, and when water adheres to the surface, the touch screen 2B detects contact at some of the detection points 60. Consequently, the first condition includes a condition for estimating that the subject apparatus is not being immersed in water when contact is not detected at some of the detection points 60.

The estimation condition data includes information indicating a second condition. The second condition includes a condition for estimating that the subject apparatus has been out of water. The second condition is a condition corresponding to a predetermined detection point 60 for use in the estimation of having been out of water. The second condition includes a detection threshold and a detection range corresponding to the predetermined detection point 60, for example. The predetermined detection point 60 may be all the detection points 60. The predetermined detection point 60 may be some of the detection points 60. The second condition may include a change range per predetermined time.

When being immersed in water, the smartphone 1 cannot detect any gesture via the touch screen 2B. Consequently, after estimating that the subject apparatus is being immersed in water, the smartphone 1 can limit the first electrodes 2B1 and the second electrodes 2B2 operated on the touch screen 2B. The smartphone 1 can operate only electrodes near the bezel 21, for example. The smartphone 1 can operate only electrodes passing through near the center of the touch screen 2B, for example. Consequently, the smartphone 1 can reduce power consumption when the subject apparatus is being immersed in water.

The following describes a case in which the first condition and the second condition of the estimation condition data include the detection point 60 that the smartphone 1 uses for estimation and an output range of its output value. The second condition sets the detection points 60 corresponding to electrodes operated when being in water as the detection points 60 for use in estimation. Specifically, the second condition designates the detection points 60 in the neighborhood of the bezel 21 as the detection points 60 for the smartphone 1 to use in estimation.

Figure 7:
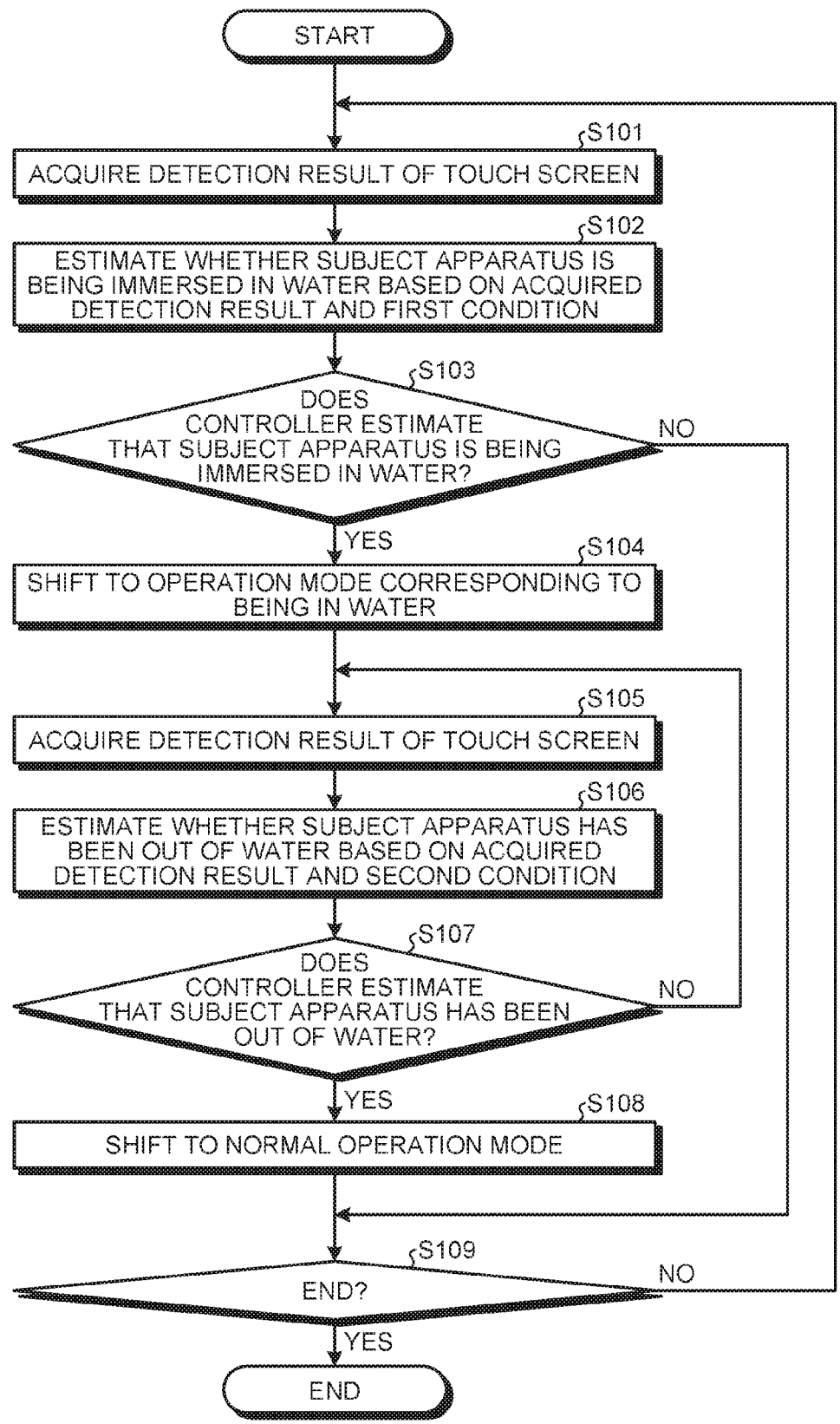
FIG. 7 is a flowchart of a processing procedure of an example of control performed by the smartphone.

The following describes a processing procedure of control by the smartphone 1 relating to estimation about whether the smartphone 1 is being immersed in water with reference to FIG. 7. FIG. 7 is a flowchart of a processing procedure of an example of control by the smartphone 1. The processing procedure illustrated in FIG. 7 is performed by causing the controller 10 to execute the control program 9A.

As illustrated in FIG. 7, the controller 10 of the smartphone 1 acquires a detection result of the touch screen 2B at Step S101. Specifically, the controller 10 scans the first electrodes 2B1 and the second electrodes 2B2 of the touch screen 2B. The controller 10 can acquire all the output values of the detection points 60 as the detection result. The controller 10 can also acquire the detection point 60 where the output value thereof has been changed and a detection result indicating the output value.

The controller 10 estimates whether the subject apparatus is being immersed in water based on the detection result acquired at Step S101 and the first condition of the estimation condition data at Step S102. Specifically, the controller 10 estimates that the subject apparatus is being immersed in water when the output value of the detection point 60 designated by the first condition is within the output range of the first condition. The controller 10 estimates that the subject apparatus is not being immersed in water when the output value of the detection point 60 designated by the first condition is out of the output range of the first condition. The controller 10 estimates that the subject apparatus is not being immersed in water when contact is not detected at some of the detection points 60.

When the controller 10 estimates that the subject apparatus is being immersed in water (Yes at Step S103), the controller 10 proceeds to Step S104. The controller 10 shifts to an operation mode corresponding to being in water at Step S104. In the operation mode corresponding to being in water, the controller 10 reduces the numbers of the first electrodes 2B1 and the second electrodes 2B2 of the touch screen 2B which are operated for determining that the subject apparatus has been immersed in water. The controller 10 stops functions that cannot be provided in water.

The controller 10 acquires a detection result of the touch screen 2B at Step S105. In one of embodiments, the controller 10 acquires the detection values of the detection points 60 in the neighborhood of the bezel 21 among the detection points 60 as the detection result.

The controller 10 estimates that the subject apparatus has been out of water based on the detection result acquired at Step S105 and the second condition of the estimation condition data at Step S106. Specifically, the controller 10 estimates that the subject apparatus has been out of water when the output value of the detection point 60 designated by the second condition is within the output range of the second condition.

When the controller 10 estimates that the subject apparatus has not been out of water (No at Step S107), the controller 10 performs again the processing at Step S105 and the subsequent step that have already been described.

When the controller 10 estimates that the subject apparatus has been out of water (Yes at Step S107), the controller 10 proceeds to Step S108. The controller 10 shifts to a normal operation mode from the operation corresponding to being in water at Step S108. In the normal operation mode, the controller 10 releases the functions limited when being in the operation mode corresponding to being in water.

The controller 10 determines whether to end at Step S109. The controller 10 determines to end when an operation to turn off the smartphone 1 is detected, for example. When the controller 10 determines not to end (No at Step S109), the controller 10 returns to Step S101 and performs again the processing. When the controller 10 determines to end (Yes at Step S109), the controller 10 ends the processing procedure illustrated in FIG. 7.

When the controller 10 estimates that the subject apparatus is not being immersed in water (No at Step S103), the controller 10 proceeds to Step S109 that has already been described. When the controller 10 determines not to end (No at Step S109), the controller returns to Step S101 and performs again the processing. When the controller 10 determines to end (Yes at Step S109), the controller 10 ends the processing procedure illustrated in FIG. 7.

In the processing procedure illustrated in FIG. 7, although the controller 10 estimates that the subject apparatus is being immersed in water based on the output value of the detection point 60 of the touch screen 2B, embodiments are not limited thereto; the controller 10 can also estimate that the subject apparatus is being immersed in water when detecting contact points based on the detection result of the touch screen 2B, and when the contact points are present across the entire touch screen 2B, for example.

Although one of embodiments describes a case in which the smartphone 1 estimates whether the subject apparatus has been out of water using the second condition of the estimation condition data, embodiments are not limited thereto; the smartphone 1 can also estimate that the subject apparatus has been out of water without using the second condition when the output value of the detection point 60 falls outside the first condition of the estimation condition data, for example. The smartphone 1 does not necessarily estimate that it has been out of water, for example.

Embodiments disclosed by the present application can be modified without departing from the essence and scope of the disclosure. Furthermore, the embodiments and modifications thereof disclosed by the present application can appropriately be combined with each other. The embodiments may be modified as follows, for example.

The computer programs illustrated in FIG. 5 may be divided into a plurality of modules or coupled with other programs, for example.

Although embodiments describe a case in which a section of the touch screen display 2 in the short-side direction is convex toward the outside of the subject apparatus in the smartphone 1, embodiments are not limited thereto; in the smartphone 1, the section of the touch screen display 2 in the short-side direction is convex toward the inside of the subject apparatus, for example.

Although embodiments describe a case in which the surface of the touch screen display 2 is curved in the smartphone 1, embodiments are not limited thereto; when the smartphone 1 has a step between the touch screen 2B and the bezel 21, the surface of the touch screen display 2 may be a plane, for example.

Although embodiments describe the smartphone 1 as an example of the mobile apparatus including the touch screen 2B, the mobile apparatus according to the accompanying claims is not limited to a smartphone; the mobile apparatus according to the accompanying claims may be a mobile electronic device other than the smartphone. Examples of the mobile electronic device include, but are not limited to, mobile phones, tablets, portable personal computers, digital cameras, smart watches, media players, electronic book readers, navigators, and game machines.

Characteristic embodiments have been described in order to disclose the techniques according to the accompanying claims perfectly and clearly. However, the accompanying claims should not be limited to embodiments and should be configured to embody all modifications and alternative configurations that those skilled in the art can create within the scope of the basic matters disclosed in the present specification.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile apparatus, comprising:
   a touch screen including a plurality of detection points, each of which is configured to detect contact with a contacting object;
   a housing including a bezel positioned around the touch screen; and a controller configured to estimate that the mobile apparatus is being immersed in water when a detection result of the touch screen satisfies a predetermined condition, wherein:

the touch screen includes a first region and a second region, the first region includes a central region on a surface of the touch screen, the second region is positioned around the first region on the surface of the touch screen and includes regions adjacent to the bezel on the surface of the touch screen, the surface of the touch screen has a convex shape, the bezel protrudes from the second region to cause a step between the second region and the bezel, and the controller is configured to estimate that the mobile apparatus is not being immersed in water, when all of the plurality of detection points detect contact with the contacting object and when a detection value of a detection point among the plurality of detection points and provided in the second region is smaller than a detection value of a detection point among the plurality of detection points and provided in the first region.

2. The mobile apparatus according to claim 1, wherein the controller is configured to estimate that the mobile apparatus is not being immersed in water when contact is not detected at some of the plurality of detection points of the touch screen.

3. The mobile apparatus according to claim 1, wherein the controller is configured to estimate that the mobile apparatus is being immersed in water when detection values at all of the plurality of detection points are within a predetermined range.

4. The mobile apparatus according to claim 1, further comprising a key, wherein there is a step between the touch screen and the key, and the key protrudes from the touch screen.

5. The mobile apparatus according to claim 4, wherein there are steps among the touch screen, the bezel, and the key, and the key protrudes from the touch screen and the bezel.

6. The mobile apparatus according to claim 1, wherein the controller is configured to estimate that the mobile apparatus has been out of water when the detection result of the touch screen satisfies a second condition after the controller estimates that the mobile apparatus is being immersed in water.

7. A mobile apparatus, comprising:

a touch screen; and a controller configured to estimate that the mobile apparatus is being immersed in water when a detection result of the touch screen satisfies a predetermined condition, wherein the controller is configured to estimate that the mobile apparatus has been out of water when the detection result of the touch screen satisfies a second condition after the controller estimates that the mobile apparatus is being immersed in water.

8. A non-transitory storage medium that stores a control program for causing, when executed by a mobile apparatus including a touch screen including a plurality of detection points each of which detects contact with a contacting object, and a housing including a bezel positioned around the touch screen, the mobile apparatus to execute estimating that the mobile apparatus is being immersed in water when a detection result of the touch screen satisfies a predetermined condition, wherein:

the touch screen includes a first region and a second region, the first region includes a central region on a surface of the touch screen, the second region is positioned around the first region on the surface of the touch screen and includes regions adjacent to the bezel on the surface of the touch screen, the surface of the touch screen includes a convex shape, the bezel protrudes from the second region to cause a step between the second region and the bezel, and the estimating estimate that the mobile apparatus is not being immersed in water, when all detection points detect contact with the contacting object and when a detection value of a detection point provided in the second region is smaller than a detection value of a detection point provided in the first region.

* * * * *